Aug. 20, 1929.          H. UFER          1,725,686
FILE WITH DOUBLE CUT
Filed Jan. 4, 1927
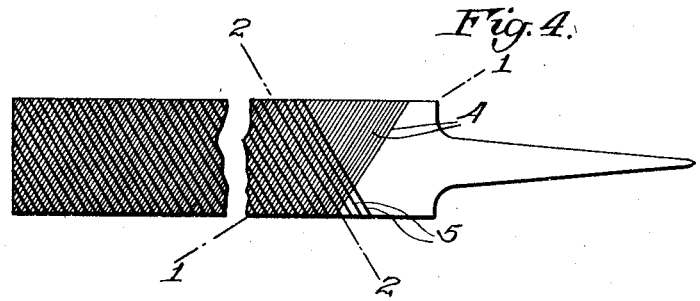
Fig. 4.
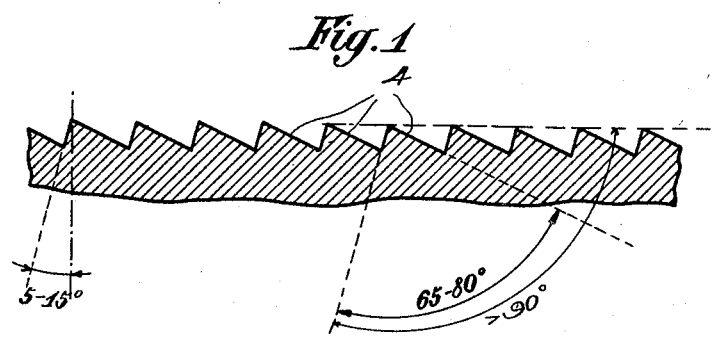
Fig. 1
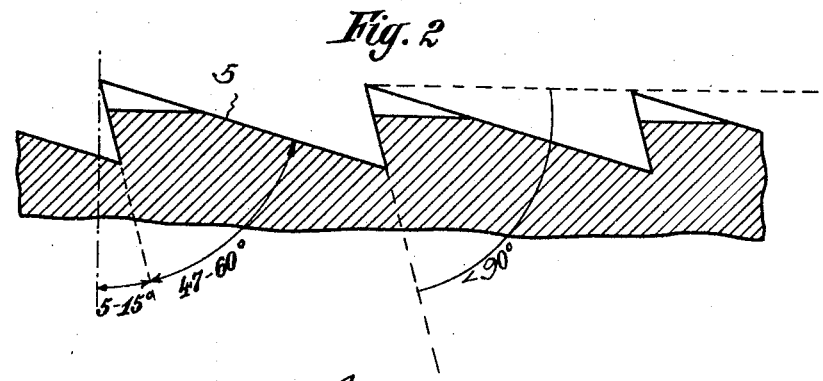
Fig. 2
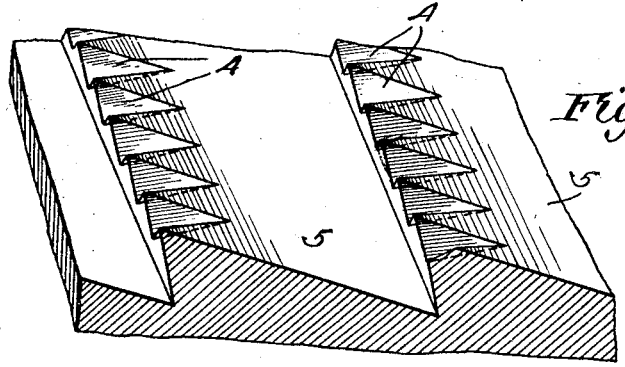
Fig. 3.
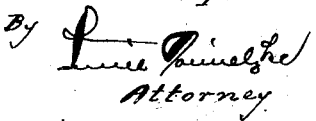
Inventor:
Hubert Ufer
By
Attorney Patented Aug. 20, 1929.

1,725,686

UNITED STATES PATENT OFFICE.

HUBERT UFER, OF BERLIN, GERMANY.

FILE WITH DOUBLE CUT.

Application filed January 4, 1927, Serial No. 158,956, and in Germany October 20, 1925.

The teeth of a file act like milling cutters. The most efficient form of the teeth should therefor consist of a body which is triangular in cross-section the cutting face of which is undercut. Such teeth however will easily break out, so that this form of tooth does not present the best efficiency which in files is equal to their duration of life.

According to the present invention this efficiency is considerably increased, compared with files having undercut teeth by giving to two series of teeth produced by the strokes of chisels different cutting angles and depth.

Referring to the drawings in which like reference numerals refer to corresponding parts:

Figure 1 is a cross-section through a portion of the file, taken on line 1—1 of Fig. 4, showing the first or lower cuts, Fig. 2 is a cross-section through a portion of the file, taken on line 2—2 of Fig. 4, showing the second or upper cuts.

Fig. 3 is a perspective view of a portion of the file showing both cuts, and

Fig. 4 is a top view of the file.

The teeth produced by the first or lower cut 4 have a bottom angle of from 65 to 80° and an over cut angle of not more than 15°.

The teeth produced by the second or upper cut 5 have a bottom angle of from 47 to 60° and an undercut angle of not more than 15°. The proportion of the depth of the teeth of the finer lower cut to the depth of the teeth of the coarser upper cut is 1 to 3 to from 1 to 7.

The proportion of the lower cuts to the upper cuts may be from 17 to 34 lower cuts to 8 to 12 upper cuts.

The cuts may also be made in opposite order, that is to say the coarse cuts may be cut first.

As clearly shown in Figs. 1 and 2, the first or lower cut teeth have front cutting angles, which are greater than 90° and the second or upper cut teeth have front cutting angles, which are less than 90°, the angles being measured by a line drawn through the points of the teeth formed by the cuts.

I claim:

1. A double cut file having intersecting cuts, in which the teeth produced by the first or lower cut have a bottom angle of from 65 to 80° and an overcut angle of not more than 15° and the teeth produced by the second or upper cut have a bottom angle of from 47 to 60° and an undercut angle of not more than 15°, the proportion of the depth of the teeth of the undercut to that of the teeth of the upper cut being from 1 to 3 to 1 to 7.

2. A double cut file having intersecting cuts comprising first or lower cut teeth having front cutting angles which are greater than 90° to a line through the points of the teeth formed by the cuts; and second or upper cut teeth having front cutting angles which are less than 90° to a line through the points of the teeth formed by the cuts.

In testimony whereof I have affixed my signature.

HUBERT UFER.